(12) United States Patent
Pierce

(10) Patent No.: US 11,905,101 B2
(45) Date of Patent: Feb. 20, 2024

(54) METHOD OF MAKING DOUBLE-WALLED STRUCTURE, AND STRUCTURE FORMED BY THE METHOD

(71) Applicant: Celwise AB, Norrköping (SE)

(72) Inventor: David Pierce, Norrköping (SE)

(73) Assignee: Celwise AB, Norrköping (SE)

( * ) Notice: Subject to any disclaimer, the term of this patent is extended or adjusted under 35 U.S.C. 154(b) by 157 days.

(21) Appl. No.: 17/261,138

(22) PCT Filed: Jul. 19, 2019

(86) PCT No.: PCT/EP2019/069510
§ 371 (c)(1),
(2) Date: Jan. 18, 2021

(87) PCT Pub. No.: WO2020/016413
PCT Pub. Date: Jan. 23, 2020

(65) Prior Publication Data
US 2021/0316935 A1    Oct. 14, 2021

(30) Foreign Application Priority Data

Jul. 19, 2018   (SE) .................................... 1850917-4
Jan. 3, 2019   (SE) .................................... 1950007-3

(51) Int. Cl.
*B65D 81/38* (2006.01)
*D21J 3/10* (2006.01)
(Continued)

(52) U.S. Cl.
CPC .......... *B65D 81/3869* (2013.01); *B29C 39/12* (2013.01); *B31F 1/007* (2013.01);
(Continued)

(58) Field of Classification Search
CPC ...... B65D 1/265; B65D 3/06; B65D 81/3869; B29C 39/12; B29C 51/006;
(Continued)

(56) References Cited

U.S. PATENT DOCUMENTS

| 2,420,215 A | 5/1947 | Wiley |
| 9,290,312 B2 | 3/2016 | Brown |

(Continued)

FOREIGN PATENT DOCUMENTS

| CN | 102333703 A | | 1/2012 |
| CN | 106628479 A | * | 5/2017 |

(Continued)

OTHER PUBLICATIONS

International Search Report and Written Opinion for International Application No. PCT/EP2019/069510, dated Feb. 14, 2020, (15 pages).

(Continued)

*Primary Examiner* — Nathan J Newhouse
*Assistant Examiner* — Phillip D Schmidt
(74) *Attorney, Agent, or Firm* — Kagan Binder, PLLC

(57) ABSTRACT

The document relates to a method of making a disposable double walled structure comprising an inner wall portion (51) surrounding a product space presenting a cross section and extending along an axial direction, perpendicular to the cross section, between first and second axially spaced apart portions, and an outer wall portion (52) at least partially surrounding the inner wall portion (51), wherein an insulating space is formed between the inner and outer wall portions. The method comprises forming the inner and outer walls (51, 52) in one piece, such that the inner and outer walls are connected at the first axial portion and at least partially overlap as seen in a direction perpendicular to the axial direction, and bending at least one of the inner (51) and outer (52) wall portions in the direction perpendicular to the axial direction towards the other one of the inner (51) and outer (52) wall portions at the second axial portion, so as to form the insulating space.

22 Claims, 13 Drawing Sheets

(51) Int. Cl.
  B65D 1/26     (2006.01)
  B65D 3/06     (2006.01)
  D21J 7/00     (2006.01)
  B29C 39/12    (2006.01)
  B32B 37/00    (2006.01)
  B31F 1/00     (2006.01)
  B29C 51/00    (2006.01)

(52) U.S. Cl.
  CPC .......... *B32B 37/0076* (2013.01); *B65D 1/265* (2013.01); *B65D 3/06* (2013.01); *D21J 3/10* (2013.01); *D21J 7/00* (2013.01); *B29C 51/006* (2013.01); *B31F 2201/0764* (2013.01)

(58) Field of Classification Search
  CPC .......... B32B 37/0076; D21J 3/10; D21J 7/00; B31D 5/00; B31D 5/006; B31D 5/0069; B31D 2205/00; B31F 1/007; B31F 1/0077; B31F 1/07; B31F 2201/07; B31F 2201/0761; B31F 2201/0764; B31F 2201/0774
  See application file for complete search history.

(56) References Cited

U.S. PATENT DOCUMENTS

| | | | |
|---|---|---|---|
| 2005/0040218 A1* | 2/2005 | Hinchey | B65D 1/265 220/592.17 |
| 2007/0181591 A1 | 8/2007 | Pierce et al. | |
| 2011/0011549 A1 | 1/2011 | Pierce et al. | |
| 2012/0094816 A1* | 4/2012 | Trani | B65D 81/3865 493/52 |
| 2015/0048086 A1 | 2/2015 | Brown | |
| 2017/0295969 A1 | 10/2017 | Ben Ezri | |
| 2018/0030658 A1 | 2/2018 | Chung et al. | |

FOREIGN PATENT DOCUMENTS

| | | | |
|---|---|---|---|
| EP | 0563426 B1 * | 12/1996 | |
| EP | 1474333 B1 | 10/2006 | |
| EP | 1815066 B1 | 9/2011 | |
| EP | 2649911 A2 | 10/2013 | |
| EP | 2848554 B1 | 4/2017 | |
| EP | 3153431 B1 | 4/2018 | |
| JP | 62159044 A | 7/1987 | |
| JP | 2001122240 A * | 5/2001 | |
| JP | 2001122240 A | 5/2001 | |
| WO | 03068613 A1 | 8/2003 | |
| WO | WO-03068613 A1 * | 8/2003 | ............... B65D 3/06 |
| WO | 2006007416 A1 | 1/2006 | |
| WO | 2009132318 A1 | 10/2009 | |
| WO | 2010079417 A2 | 7/2010 | |
| WO | 2010124300 A1 | 10/2010 | |
| WO | 2016101976 A1 | 6/2016 | |

OTHER PUBLICATIONS

Swedish Search Report for Swedish Application No. 1850917-4, dated Jan. 30, 2019, (5 pages).
E-Space English Abstract for CN 102333703 A.
E-Space English Abstract for JP 2001122240 A.
E-Space English Abstract for JP 62159044 A.

* cited by examiner

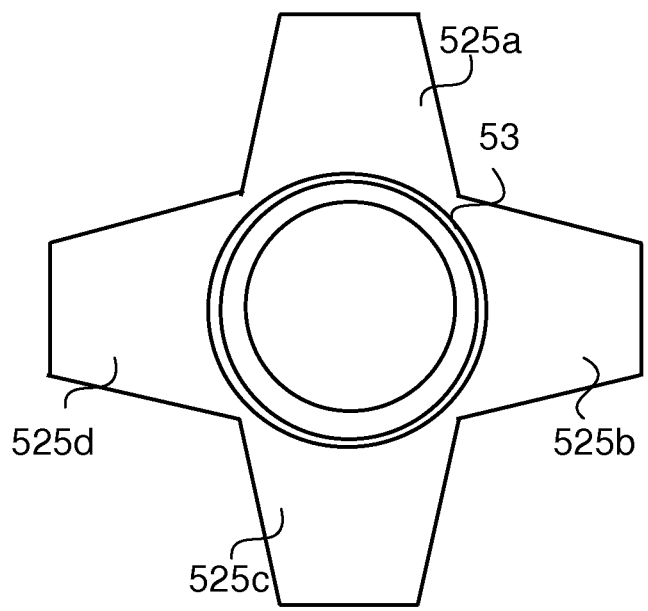
Fig. 12a
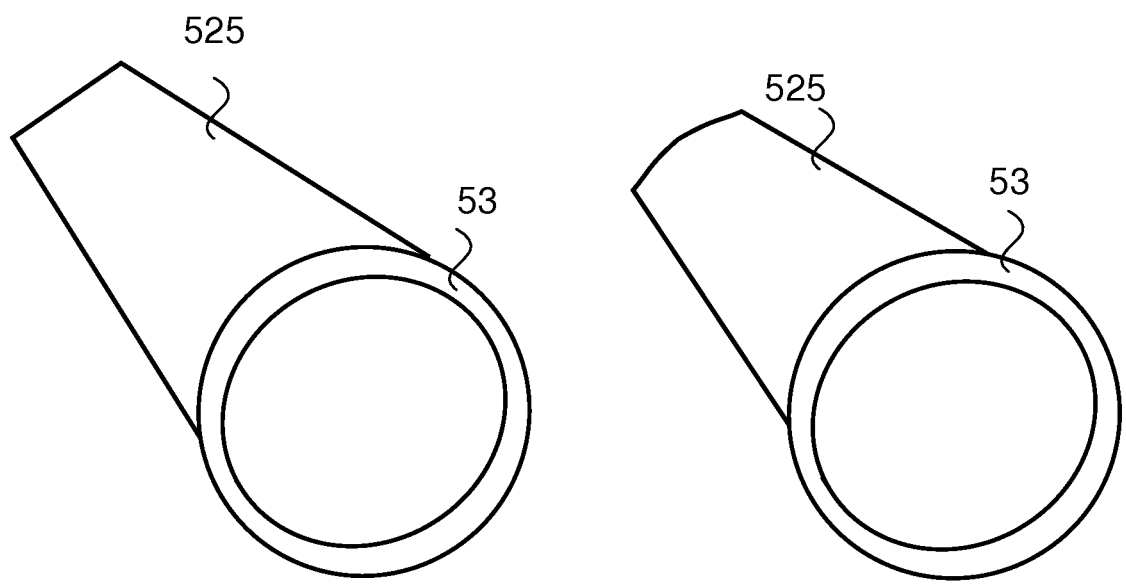
Fig. 12b
Fig. 12c

METHOD OF MAKING DOUBLE-WALLED STRUCTURE, AND STRUCTURE FORMED BY THE METHOD

CROSS-REFERENCE TO RELATED APPLICATIONS

This application claims priority to International Application No. PCT/EP2019/069510, filed Jul. 19, 2019 and titled "METHOD OF MAKING DOUBLE-WALLED STRUCTURE, AND STRUCTURE FORMED BY THE METHOD," which in turn claims priority from a Swedish Patent Application having serial number 1950007-3, filed Jan. 3, 2019, titled "METHOD OF MAKING DOUBLE-WALLED STRUCTURE, AND STRUCTURE FORMED BY THE METHOD," and Swedish Patent Application having serial number 1850917-4, filed Jul. 19, 2018, titled "METHOD OF MAKING DOUBLE-WALLED STRUCTURE, AND STRUCTURE FORMED BY THE METHOD," all of which are incorporated herein by reference in their entireties.

TECHNICAL FIELD

The present disclosure relates to a method of making a disposable double walled structure, and to a double walled structure which can be produced according to the method.

BACKGROUND

It is common to use disposable products when serving food and in particular fast food or other pre-cooked food. It is also common to use disposable products when serving beverages.

Foods that are intended to be served and/or consumed at a specific temperature substantially different from ambient temperature are frequently served in a container that is wholly or partially insulating. Such insulation may be used both to preserve the temperature of the food or beverage, and to protect the user from injury or discomfort, as is the case with hot beverages.

Hence, there is a general need for disposable products that are capable of providing heat insulation.

Moreover, and in particular in response to environmental concerns, there is a desire to use products which are environmentally friendly, which is often not the case with polymer based products. Ideally, the product should be recyclable, and/or biodegradable.

Moreover, the products should be possible to produce at low cost and large volumes and they should preferably have an attractive appearance.

From WO2016101976A1 there is known a method of producing products from a pulp slurry by applying the slurry layer to a porous mold and removing water from the slurry by simultaneously heating and pressing the slurry layer while drawing a vacuum through a mold wall, the other side of which being in contact with the slurry layer.

There is a need for new ways of making disposable products with heat insulating properties, which are environmentally friendly and which can be produced at low cost.

SUMMARY

An object of the present disclosure is to provide an enhanced concept for making packages or serveware that are disposable and yet environmentally friendly in the sense that they can be readily recycled, as well as aesthetically pleasing. A particular object is to provide serveware, such as cups or bowls, that present thermally insulating properties.

The invention is defined by the appended independent claims, with embodiments being set forth in the independent claims, in the following description and in the drawings.

According to a first aspect, a method of making a disposable double walled structure is provided. The double wall structure comprises an inner wall portion surrounding a product space presenting a cross section and extending along an axial direction, perpendicular to the cross section, between first and second axially spaced apart portions, and an outer wall portion at least partially surrounding the inner wall portion, wherein an insulating space is formed between the inner and outer wall portions. The method comprises forming the inner and outer walls in one piece, such that the inner and outer walls are connected at the first axial portion and at least partially overlap as seen in a direction perpendicular to the axial direction, and bending at least one of the inner and outer wall portions in the direction perpendicular to the axial direction towards the other one of the inner and outer wall portions at the second axial portion, so as to form the insulating space.

A circumference of the product space may be continuous, in the sense that it does not present any joint. The axial portions may be end portions and may coincide with axial ends of the structure. Alternatively, the wall portions will only partially overlap, as seen in the axial direction, whereby the insulating space may extend over a part of the axial length of the structure.

A greatest thickness of the insulating space, as seen in a direction perpendicular to the axial direction, may be greater than a thickness of the inner wall portion, preferably at least twice or at least three times the thickness of the inner wall portion.

The inner and outer wall portions may extend at different angles relative to the axial direction. In particular, as seen in a plane containing a geometric center of gravity of the cross section, the inner and outer walls present an angle greater than 0 and less than 100 degrees, preferably 5-80 degrees, 5-40 degrees or 10-30 degrees.

The cross section may be generally curved, such as circular, oval, elliptic, super elliptic, super circular.

The cross section may be generally polygonal, such as rectangular, square, pentagonal, hexagonal, heptagonal, octagonal, etc.

The cross section may vary along the axial direction. In particular, the cross section may taper from the first axial portion to the second axial portion. In particular, the taper may be linear over at least 50% of an axial length, preferably at least 70% or at least 90%.

The method as per above can be used to produce a double walled container or sleeve.

The forming can comprises applying a material to a forming surface of a first press mold part of a first pressing tool and subsequently pressing the material between the first press mold part and a second press mold part of the first pressing tool.

The working direction of the pressing tool, i.e. the direction of the relative mold movement, corresponds to the axial direction. Typically, a pressing force between the press mold parts may be applied along the axial direction.

The forming can further comprise transferring the pressed material to forming surface of a first press mold part of a second pressing tool and subsequently pressing the material between the first press mold part and a second press mold part of the second pressing tool.

The forming can further comprise transferring the pressed material to forming surface of a first press mold part of a third pressing tool and subsequently pressing the material between the first press mold part and a second press mold part of the third pressing tool.

The forming can comprise at least one of drawing vacuum and applying heat, through at least one of the first and second press mold parts.

The forming can further comprise depositing the material on the forming surface of the first pressing tool, or on a separate forming tool and subsequently transferring the material to the first pressing tool.

The deposition may be achieved through immersion of the forming surface into a slurry, by spraying or rolling a slurry onto the forming surface, or by preforming the material in a pickup tool and transferring it onto the forming surface.

The wall portions can be formed from a pulp material.

Such materials are well known and available. Typically, application is performed from a suspension in water, through immersion or spraying.

The bending can be performed with initial water content of the pulp slurry layer of about 45-65%, typically about 50-60% by weight, or with an initial water content of the pulp slurry layer of about 25-45% by weight, preferably about 30-40% by weight.

A final water content can be less than about 5% by weight, preferably less than about 1% by weight.

The forming can comprise defining at least one fold mark in at least one of the inner and outer wall portions.

A fold mark may be adapted for achieving a circumferential shrink. Alternatively, or as a supplement, a fold mark may be provided to allow for shrinking in a direction perpendicular to the circumferential direction.

The fold mark may be formed by one or more slits, grooves or depressions.

Fold marks may be formed as thinner lines or portions in the material.

In a specific case, the fold marks may run along the axial direction of the structure.

It is also possible to make those portions of the wall portions that are to be folded away and hence not exposed, thinner. This may be achieved by applying a lower vacuum level or a lower porosity to corresponding portions of the mold.

The bending can comprise shrinking at least one of the inner and outer wall portions in at least a circumferential direction.

The shrinking may be facilitated by a pre-formed fold mark. However, fold marks are not necessary for achieving shrinking, in particular in case the shrinking is performed before too much solvent has been removed from the material.

As an alternative to defining at least one fold mark in at least one of the inner and outer wall portions, the forming can comprise forming the outer wall portion such that at least two wall tongues are provided, wherein the wall tongues are separated by a slit.

This provides a cost-efficient way of producing a double-wall structure. The use of material as well as the time for producing the double-wall structure can be reduced, as compared to defining fold marks and shrinking of at least one of the inner and outer wall portions.

The wall tongues can have a wall tongue length corresponding to a first distance between the first and second axially spaced apart portions±15%, preferably ±10%.

The slit can have a slit length corresponding to 75-100% of the wall tongue length, preferably 85-100%, and more preferably 95-100%.

The bending can comprise bending the wall tongues such that a slit width of the slit is less than 5 mm, preferably less than 1 mm, preferably less than 0.5 mm.

The "slit width" is defined as the width of an open space between two adjacent wall tongues separated by the slit.

Consequently, during the bending step, the wall tongues of the outer wall portion may be bent towards the inner wall portion at the second axial portion, such that an insulating space is formed between the inner wall portion and the outer wall portion comprising the wall tongues, and such that there is substantially no open space between two adjacent wall tongues.

The forming may further comprise forming the wall tongues such that they obtain an outwardly extending convex curvature, as seen from the inner wall portion.

Consequently, the wall tongues can obtain an outwardly bulging form, as seen from the inner wall portion.

Consequently, when at least one of the inner and outer wall portions are bent in the direction perpendicular to the axial direction towards the other one of the inner and outer wall portions at the second axial portion, the wall tongues of the outer wall portion can bulge out from the inner wall portion such that an insulating space is formed in-between the inner and outer wall portion.

The forming may further comprise forming a first portion of a first wall tongue such that a first locking surface is provided, and forming a second portion of a second wall tongue, adjacent to the first wall tongue, such that a second locking surface is provided, wherein the first and second locking surfaces substantially match such that they can interlock.

The first and second locking surfaces can be provided on opposite sides of a slit, extending in an essentially axial direction along at least a part of the wall tongue length.

The bending may further comprise bending the wall tongues such that the first and second wall tongues at least partially overlap, and causing the first and second locking surfaces to interlock.

The method can further comprise joining the inner and outer wall portions at said second axial portion.

Such joining may comprise adhering the second portions of the first and second wall portions.

The method can further comprise providing an additional layer between at least part of a contact surface between the inner and outer wall portions.

Such an additional layer may comprise a cellulose film, which optionally may comprise at least one adhesive layer.

The method can further comprise forming the second axial portion of at least one of the wall portions, such that a residual deformation is achieved, so as to retain a shape of the double walled structure.

The residual deformation can be achieved through folded paper memory. As a result, the inner and outer wall portions can be folded and joined in such a way that no adhesive is needed.

According to a second aspect, there is provided a method of forming a receptacle, wherein the method comprises the method described above according to the first aspect, wherein the first axial portion presents an open end of the product space and the second axial portion presents a closed end of the product space.

The bending can comprise folding a second axial portion of the outer wall portion radially inwardly so as to at least partially overlap the closed end of the product space.

According to a third aspect, there is provided a disposable double walled structure, comprising an inner wall portion surrounding a product space presenting a cross section and extending along an axial direction, perpendicular to the cross section, between first and second axially spaced apart portions, and an outer wall portion at least partially surrounding the inner wall portion, wherein an insulating space is formed between the inner and outer wall portions. The inner wall portion and the outer wall portion are formed in one piece of material, and a first transition between the inner and outer wall portions, at one of the axially spaced apart portions, is formed by a continuous bend or fold of said piece of material.

One of the axially spaced apart portions can form a closed end and the other one of the portions can form an open end, such that the space defines an axially open receptacle.

The inner wall portion or the outer wall portion can comprise at least one radial step formation.

The radial step formation may be provided as a continuously circumferential step, or as one or more partially circumferential step portions.

The step formation can be located within a portion of the wall portion which is closest to the open end, and said portion preferably corresponds to 50% of an axial extent of the wall portion, preferably 33%, and more preferably 25%.

The step formation can provide a variation of the distance between the inner and outer wall portions, wherein the variation corresponds to 1-20% of the distance between the inner wall portion (51) and a center of the product space, preferably 1-10%, or more preferably 3-10%.

The first transition can form a rim of the receptacle.

The second axial portion of the outer wall portion can extend radially inwardly so as to at least partially overlap a bottom at the closed end.

The inner and/or outer wall portions can comprise at least one depression located at a circumference of the bottom of the receptacle.

The at least one depression, may be used to absorb the excess material that is provided when the second axial portions extend radially inwardly so as to at least partially overlap a bottom at the closed end.

A second transition between the inner and outer wall portions, at the other one of the axially spaced apart portions, can be formed by a joint between the first and second wall portions.

At least one of the inner and outer wall portions can be rotational symmetric.

The structure can further comprise at least one fold mark extending along at least one of the inner and outer walls.

Alternatively, the outer wall portion can comprise at least two wall tongues separated by a slit.

The wall tongues can have a wall tongue length corresponding to a first distance between the first and second axially spaced apart portions±15%, preferably ±10%.

The slit can have a slit length corresponding to 75-100% of the wall tongue length, preferably 85-100%, and more preferably 95-100%.

A slit width of the slit can be less than 5 mm, preferably less than 1 mm, preferably less than 0.5 mm.

The wall tongues can have an outwardly extending convex curvature, as seen from the inner wall portion.

A first wall tongue and a second adjacent wall tongue can at least partially overlap.

An overlapping region may extend along axially extending edges of the wall tongues.

The first wall tongue and the second wall tongue can be interlocked by means of a first locking surface provided on the first wall tongue and a second matching locking surface provided on the second wall tongue.

The structure can be formed of a pulp material.

The structure can further comprise an adhesive layer sandwiched between at least part of the inner and outer wall portions.

The structure can further comprise a sealing layer sandwiched between at least part of the inner and outer wall portions.

The sealing layer may be adapted as a vapor and/or moisture barrier.

The sealing layer may be of a biodegradable material, e.g. a cellulose film such as cellophane.

The sealing layer may have the form of a sleeve.

The adhesive layer and the sealing layer may be the same or different layers.

The open end can be adapted to receive and attach a lid detachably in such a way that a closed end is formed.

By "attach detachably" is meant that the established attachment between the structure and lid is not permanent, i.e. the two portions can be separated and attached various times without breaking.

The structure may be formed such that a circumference of the product space is continuous in the sense that it does not present any joint.

BRIEF DESCRIPTION OF THE DRAWINGS

FIG. 12a-12g schematically illustrates a method of forming a fifth version of the double walled container.

DETAILED DESCRIPTION

Figure 1A:
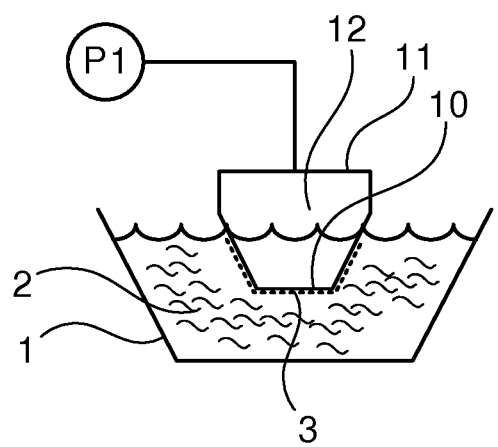
FIGS. 1a-1c schematically illustrate a molding device.

FIG. 1a schematically illustrates a pickup tool 1 which is partially immersed in container 1 holding a pulp slurry 2. The pickup tool is mounted to a tool holder 11, which together with the pickup tool defines a vacuum chamber 12 that is connected to a pressure regulator P1. The pressure regulator may have the capability of selectively generating an at least partial vacuum (i.e. air pressure lower than ambient air pressure) and/or an air pressure greater than ambient air pressure.

While the pickup tool is immersed in the pulp slurry 2, the pressure regulator P1 may generate a vacuum, causing pulp fibers 3 to stick to a product face of the pickup tool 10.

Figure 1B:
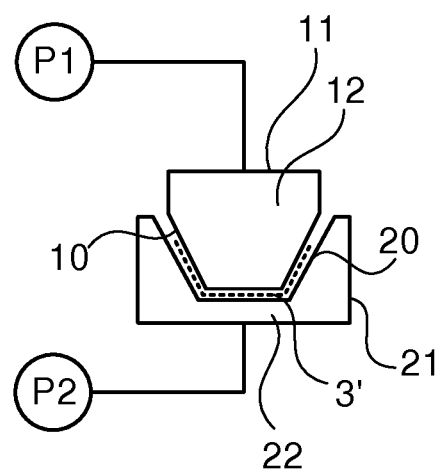

FIG. 1b schematically illustrates the pickup tool 10 transferring the pulp fibers 3 to a transfer tool 20. The transfer tool may be connected to a second pressure regulator P2, which is capable of generating a vacuum or an air pressure. The transfer tool may also be mounted on a transfer tool holder 21 so as to define a vacuum chamber 22, which is connected to the second pressure regulator.

During the transfer of the pulp fibers 3 from the pickup tool to the transfer tool, an air pressure greater than ambient pressure may be generated by the first pressure regulator P1 to cause the pulp fibers to release from the pickup tool.

Alternatively, or as a supplement, a vacuum may be generated by the second pressure regulator P2, causing the pulp fibers to be received by the transfer tool 20.

Figure 1C:
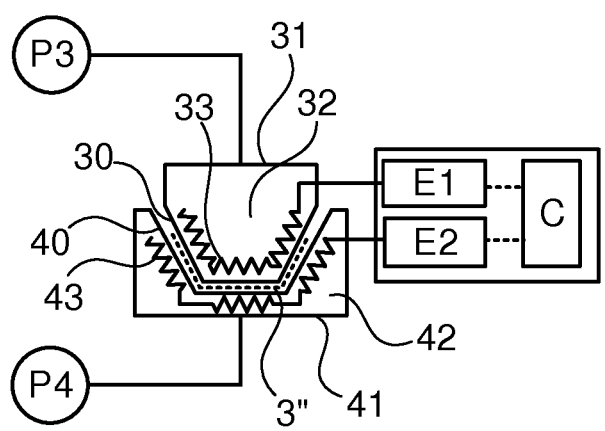

FIG. 1c schematically illustrates a pressing arrangement comprising a male pressing tool 30 and a female pressing tool 40. One, or both, of the pressing tools may be mounted on a respective tool holder 31, 41 and be connected to a respective vacuum chamber 32, 42. The vacuum chambers may be connected to a respective pressure regulator P3, P4.

One, or both, of the pressing tools may be provided with a heating element 33, 43, energized by an energy supply E1, E2 and optionally controlled by a controller C. The heating may be achieved by electric heating elements, hot air or liquid or induction.

The pressing tools and their associated tool holders may be movable relative one another between an open position, wherein a partially molded pulp product may be inserted, and a pressing position, wherein the pressing tools are forced towards each other thus pressing the product 3" between product faces of the respective tool 30, 40.

When in the pressing position, heat may be supplied by one, or both, of the heaters 33, 43.

During the pressing step, one or both pressure regulators P3, P4 may provide a vacuum to assist in the evacuation of water vapor from the product 3".

As an alternative, one of the pressure regulators may provide a vacuum while the other one provides a pressure greater than the ambient air pressure.

Optionally, hot air or steam may be introduced through the molds during the pressing process (FIG. 1c).

It is noted that two or more successive pressing steps may be used, e.g. to gradually form all or parts of the product 3" and/or to apply additional features to the product, such as coatings, decors and the like.

In one embodiment, steps are performed in accordance with what has been described with respect to FIGS. 1a, 1b and 1c.

Figure 2:
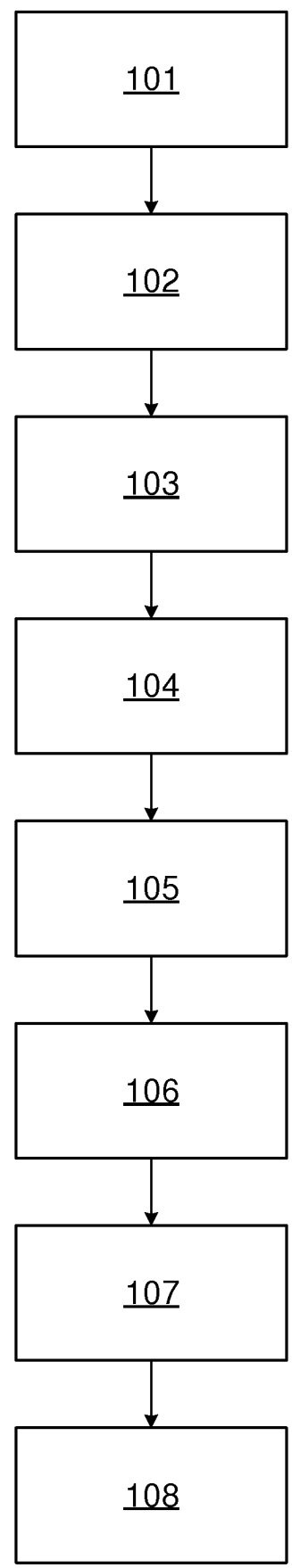
FIG. 2 schematically illustrates a production process
FIGS. 3a-3c schematically illustrate a method of forming a double walled container.

Referring to FIG. 2, a production process will now be described.

In a first step 101, a pulp slurry layer is provided, e.g. as described with reference to FIG. 1a, wherein a porous pickup tool may be submerged in a pulp slurry with vacuum being applied to a rear side of the pickup tool.

Alternatively, the pulp slurry may be applied to the pickup tool by a coating operation, such as spray coating.

The porous wall portion of the pickup tool may have a surface porosity of 40-75% with hole sizes 0.1-0.7 mm in diameter, preferably 0.25-0.6 mm.

In a second step 102, the pulp slurry layer is transferred from the pickup tool to a first press tool. The transfer may be performed by the pickup tool, or by means of a separate transfer tool, which may have a transfer tool wall portion that is porous. During the transfer step, a vacuum may be applied to the rear side of the transferring tool wall, such that the pulp slurry layer is held to the transferring tool wall. In order to release the pulp slurry layer from the transferring tool wall, it is possible to instead apply pressurized air to the rear side of the transferring tool wall.

Alternatively, the pulp slurry layer may be applied directly to the first press tool. That is, the pulp slurry layer may be formed directly on the first press tool by application of the pulp slurry to the porous forming face of the first press tool. The pulp slurry layer may be applied directly to the first press tool by submerging a tool part of the first press tool presenting a porous wall portion in a pulp slurry with vacuum being applied to a rear side of the porous wall portion. Alternatively, the pulp slurry may be applied to the porous forming face of the first press tool by a coating operation, such as spray coating.

In a third step 103, the pulp slurry layer may be pressed in the first press tool, which may comprise a pair of mating tool parts, one of which may have a porous wall portion, which contacts the pulp slurry layer, and through which a vacuum can be drawn.

In this first pressing step 103, a pressure lower than the surrounding ambient pressure is applied at a rear side of the porous wall portion, thus resulting in a vacuum at the rear side of the porous wall portion, causing solvent vapor, such as steam, to be drawn through the tool.

The porous wall portion of the first forming tool may have a surface porosity of 40-75% with hole sizes 0.1-0.7 mm, preferably 0.25-0.6 mm.

The pressure applied to the rear side of the porous wall portion may be on the order of low or medium level vacuum. That is, a first pressure may be 200-900 mbarA (millibar absolute), preferably 300-800 mbarA.

The forming face of the first mold may be heated to about 150-500° C., preferably 150-400° C., 200-500° C., 200-400° C. or 200-300° C., and in most cases 240-280° C. Typically, at least one mold face contacting the pulp slurry layer may be heated. That is one of the first and second mold parts may be heated.

A pressing pressure between mold faces may be on the order of about 390-1570 kPa, and in most cases 580-1170 kPa.

The pressing pressure may be applied during a first pressing time of 0.1-4.0 second, preferably 0.5-2.0 second. In most settings, a pressing time on the order of 0.5-1.5 second is sufficient, and often also 0.5-1 second.

Typically, in this first step, an initial water content of the pulp slurry layer is 70-90% by weight and after the pressing step has been performed, a final water content may be 45-65% by weight, typically about 50-60% by weight.

After the first pressing step 103, the pulp slurry layer, now with a substantial amount of its solvent removed, may be transferred 104 to a second press tool. The transfer 104 may be performed in the same manner as the first transfer step 102, and with similar equipment. The second press tool may be designed essentially as the first press tool.

In a second pressing step 105, the pulp slurry layer may be pressed in the second press tool, which may comprise a pair of mating tool parts, one of which may have a porous wall portion, which contacts the pulp slurry layer, and through which a vacuum can be drawn. In this second pressing step 105, a pressure lower than the surrounding ambient pressure is applied at a rear side of the porous wall portion, thus resulting in a vacuum at the rear side of the porous wall portion, causing solvent vapor, such as steam, to be drawn through the tool.

The porous wall portion of the second forming tool may have a surface porosity of 25-50% with hole sizes 0.1-1.2 mm, preferably 0.25-1.0 mm.

In the second pressing step, the absolute pressure applied to the rear side of the porous forming face of the second mold may be 200-900 mbarA, preferably 300-800 mbarA, but always greater than in the first pressing step.

The forming face of the second mold may be heated to about 110-500° C., preferably 110-400° C., 150-500° C., 150-400° C., 200-500° C., 200-400° C. or 200-300° C., and in most cases 240-280° C. Typically, all mold faces making up the second mold and contacting the pulp slurry layer may be heated.

A pressing pressure between mold faces may be on the order of about 390-1570 kPa, and in most cases 580-1170 kPa.

The pressing pressure may be applied during a second pressing time of 0.1-4.0 second, preferably 0.5-2.0 second. In most settings, a pressing time on the order of 0.5-1.5 second is sufficient, and often also 0.5-1 second.

Typically, in this second pressing step, an initial water content of the pulp slurry layer may be about 45-65%, typically about 50-60% by weight.

A final water content may be about 25-40% by weight, preferably about 30-35% by weight.

After the second pressing step 105, the pulp slurry layer, now with a substantial amount of its solvent removed, may be transferred 106 to a third press tool. The transfer 106 may be performed in the same manner as the first transfer step 102 and/or the second transfer step 104, and with similar equipment. The third press tool may be designed essentially as the first press tool.

In a third pressing step 107, the pulp slurry layer may be pressed in the third press tool, which may comprise a pair of mating tool parts, one of which may have a porous wall portion, which contacts the pulp slurry layer, and through which a vacuum can be drawn. In this third pressing step 107, a pressure lower than the surrounding ambient pressure is applied at a rear side of the porous wall portion, thus resulting in a vacuum at the rear side of the porous wall portion, causing solvent vapor, such as steam, to be drawn through the tool.

The porous wall portion of the third forming tool may have a surface porosity of 25-50% with hole sizes 0.1-1.2 mm, preferably 0.25-1.0 mm.

In the third pressing step, an absolute pressure provided at the rear of the porous wall portion of the third mold may be 200-900 mbarA, preferably 300-800 mbarA, but always greater than in the second pressing step.

The forming face of the third mold may be heated to about 100-400° C., preferably 100-300° C., 150-400° C., 150-300° C., 200-300° C. or 200-280° C., and in most cases 240-280° C. Typically, all mold faces making up the third mold and contacting the pulp slurry layer may be heated.

A pressing pressure between mold faces may be on the order of about 390-1570 kPa, and in most cases 580-1170 kPa.

The pressing pressure may be applied during a third pressing time of 0.1-4.0 second, preferably 0.5-2.0 second. In most settings, a pressing time on the order of 0.5-1.5 second is sufficient, and often also 0.5-1 second.

Typically, in this third pressing step, an initial water content of the pulp slurry layer may be about 25-45% or 25-40% by weight, preferably about 30-40% or 30-35% by weight, and a final water content may be less than about 5% by weight, preferably less than about 1% by weight.

After the third pressing step 107, the pulp slurry layer, now with most of its solvent removed, may be transferred 108 out of the machine.

Optionally, additional steps, such as surface treatment, cutting or printing may be performed on the thus essentially dry product. The product may then be packaged, stored and shipped.

It is noted that the third pressing step 107, and thus also its related transfer step 106, is optional. Hence, the process may be finished after the second pressing step 105 with the output step 108 following immediately.

Thus, in the first pressing step, an initial water content of the pulp slurry layer may be 70-90% by weight and a final water content may be 25-50% by weight, preferably about 30-35% by weight.

In the second pressing step, an initial water content of the pulp slurry layer may be about 25-50%, preferably about 30-35% by weight, and a final water content may be less than about 5% by weight, preferably less than about 1% by weight.

Figure 3A:
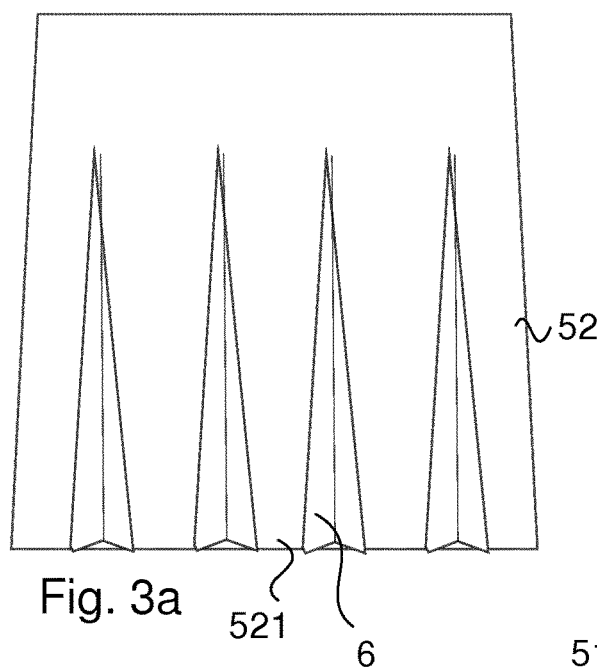
Figure 3B:
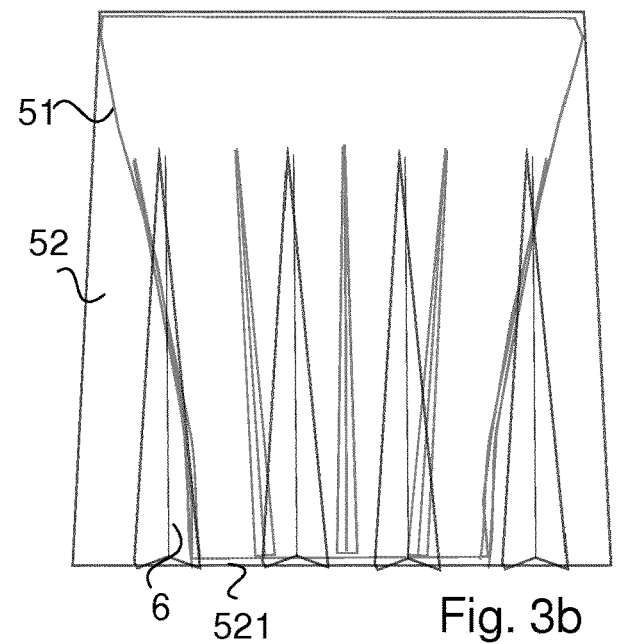
Figure 3C:
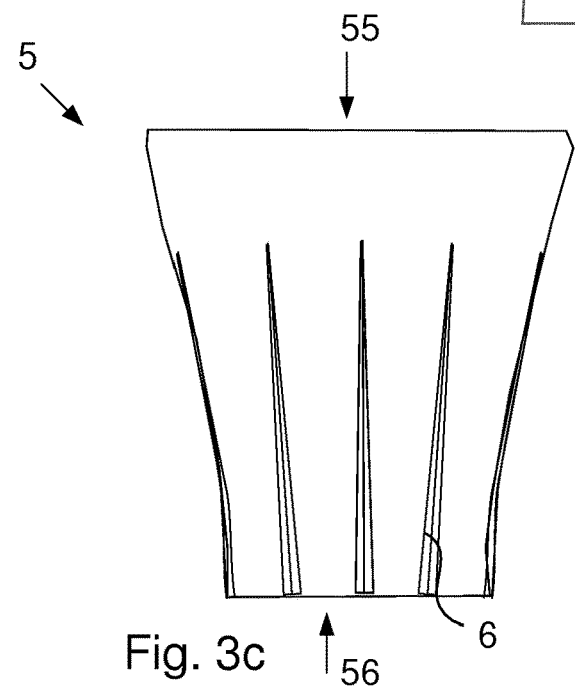

Referring to FIGS. 3a-3c, there is illustrated a general principle for forming a one-piece double walled structure. Such a double walled structure may be a container for storing and/or serving food or beverages at a temperature different than ambient temperature.

The example will be given with reference to a cup having a generally circular cross section, as illustrated in FIGS. 3a-3c.

In FIGS. 3a-3b, there is illustrated the cup 5 having an open end 55 at a first axial portion and a closed end 56 at a second axial portion. The cup 5 further has an inner wall portion 51 and an outer wall portion 52, which overlaps and surrounds the inner wall portion 51.

An insulating space is formed between the inner and outer wall portions 51, 52 by folding the outer wall portion 52 inwardly and attaching the free end of the outer wall portion 52 located at the second axial portion 521, to the inner wall 51, while leaving a void between the inner and outer wall portions.

By folding the outer wall portion 52 inwardly, a first transition 53 between the inner and outer wall portions 51, 52 is formed. The first transition 53 can form a rim of the cup 5.

By joining and attaching the free end of the outer wall portion 52 and the inner wall portion 51, a second transition 54 between the inner and outer wall portions 51, 52, is formed.

In the illustrated example, the outer wall portion 52 presents a plurality of fold marks 6. The fold marks 6 may be provided by elongate areas of decreased wall thickness.

As an alternative, the outer wall portion 52 may be provided with a plurality of cut away portions (not shown) instead.

The inner wall portion 51 can also be provided with a plurality of fold marks 6.

Referring to FIG. 3c, it can be seen how the fold marks 6 have been used to absorb the excess material that is provided through the inward folding of the outer wall portion 52.

As yet another alternative, the outer wall portion 52 may be formed such that it comprises at least two wall tongues 525a, 525b, separated by a slit.

The wall tongues 525a, 525b can have a wall tongue length corresponding to a first distance between the first and second axially spaced apart portions±15%, preferably ±10%.

The slit can have a slit length corresponding to 75-100% of the wall tongue length, preferably 85-100%, and more preferably 95-100%.

Figures 12D, 12E:
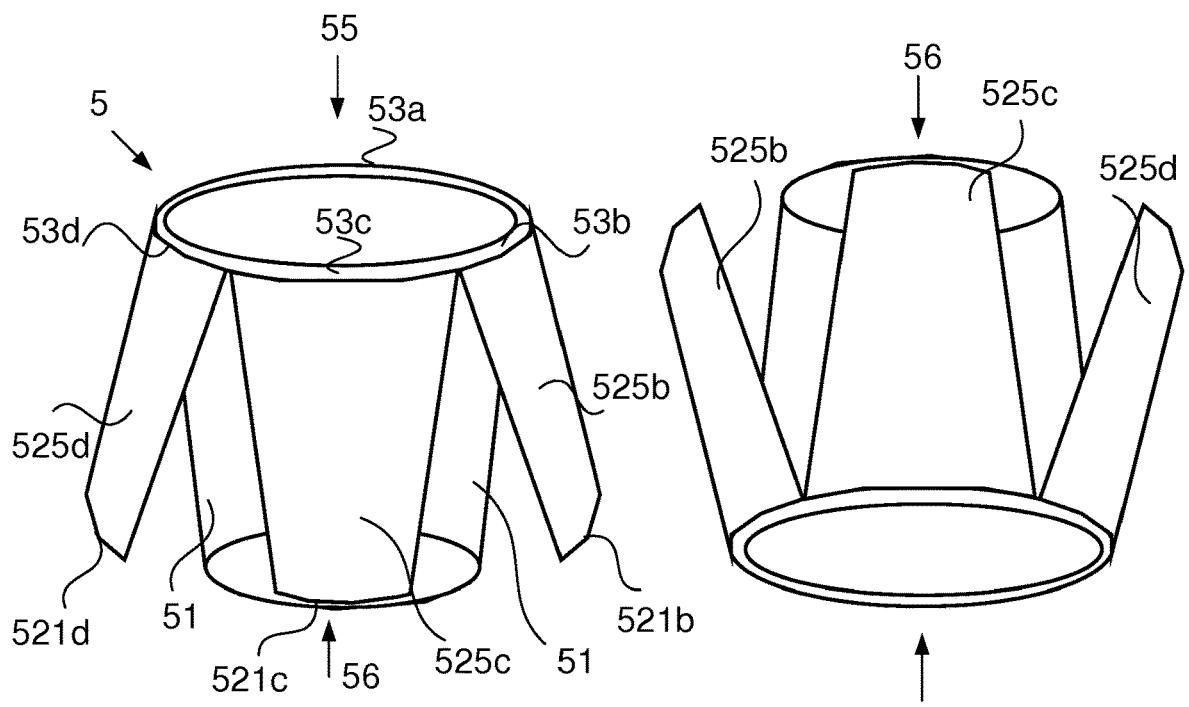
Figures 12F, 12G:
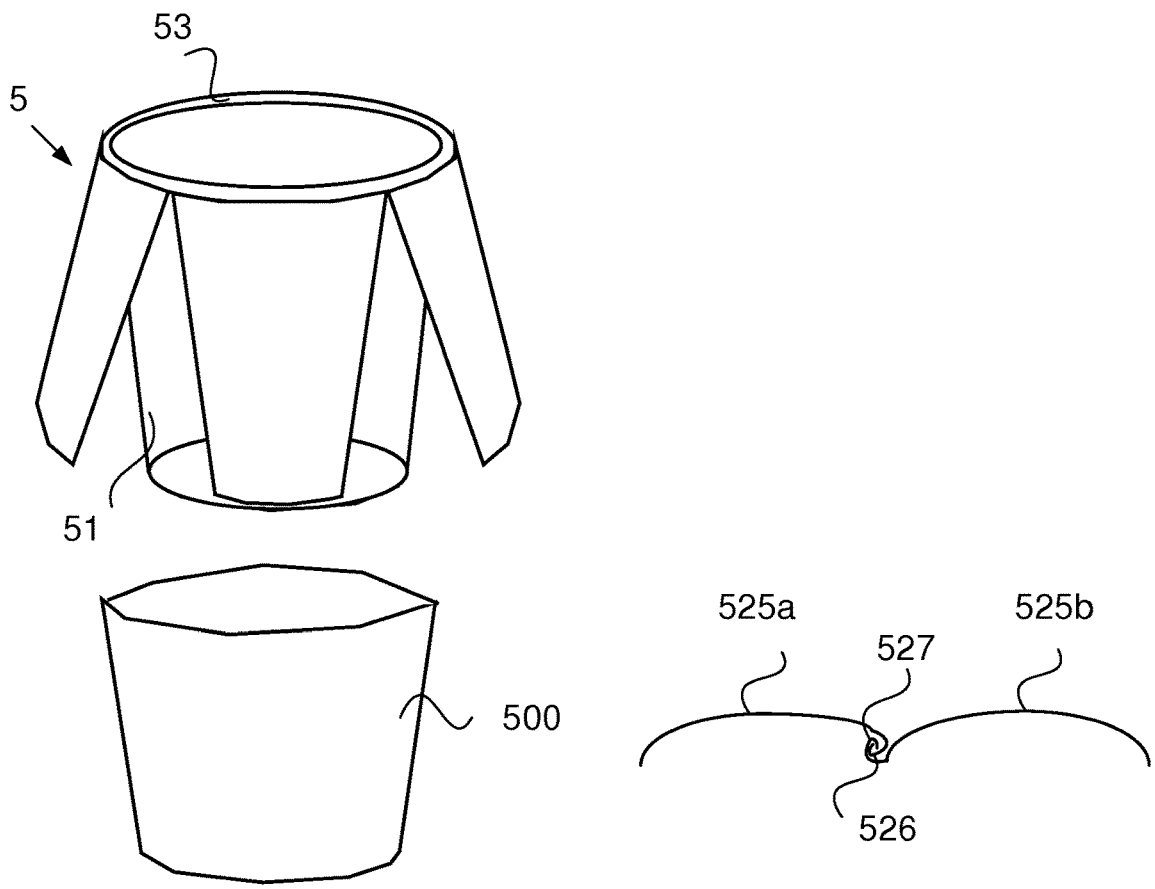

FIG. 12d-12f illustrates an outer wall portion 52 comprising four wall tongues 525a-525d.

The wall tongues 525a-525d may be formed such that they obtain an outwardly extending convex curvature, as seen from the inner wall portion.

Consequently, the wall tongues 525a-525d may be formed such they obtain a bulging form, as seen from the inner wall portion.

FIG. 12a-12b illustrate wall tongues before they have been formed such that they obtain the convex curvature. FIG. 12c illustrates a wall tongue 525 that has been formed such that it has the convex curvature.

The wall tongues may be formed such that they obtain the convex curvature before or during the bending step, i.e. the step of folding at least one of the inner and outer wall portions in the direction perpendicular to the axial direction towards the other one of the inner and outer wall portions at the second axial portion, so as to form the insulating space.

Consequently, the wall tongues may obtain the convex curvature before at least one of the inner wall portion and the wall tongues of the outer wall portion are folded in a direction perpendicular to the axial direction towards the other one of the inner and outer wall portions at the second axial portion.

As an alternative, the wall tongues may obtain the convex curvature during the bending step.

Consequently, when the respective free ends of the curve-shaped wall tongues located at the second axial portions 521a-521d are joined and attached to the inner wall 51, the wall tongues may bulge out from the inner wall portion such that an insulating space is formed in-between the inner and the outer wall portion comprising the wall tongues.

The wall tongues 525a-525d of the outer wall portion 52 may be formed and folded such that there is substantially no overlap or no open space between two adjacent wall tongues.

Alternatively, the wall tongues may be formed and folded such that there is at least a partial overlap between two adjacent wall tongues.

An overlapping region may extend along axially extending edges of the tongues.

Consequently, after the bending, a slit width of the slit separating the two wall tongues can be less than 5 mm, preferably less than 1 mm, preferably less than 0.5 mm, Further, the forming of the wall tongues may further comprise forming a first portion of a first wall tongue 525a such that a first locking surface 526 is provided, and forming a second portion of a second wall tongue 525b, adjacent to the first wall tongue, such that a second locking surface 527 is provided. The first and second locking surfaces 526, 527 substantially match such that they can interlock.

The first and second locking surfaces can be provided on opposite sides of a slit, extending in an essentially axial direction along at least a part of the wall tongue length.

The bending step can further comprise bending the wall tongues such that the first and second wall tongues at least partially overlap, and causing the first and second locking surfaces 526, 527 to interlock.

FIG. 12g schematically illustrate two overlapping wall tongues 525a, 525b which are provided with matching first and second locking surfaces 526, 527 which can be interlocked. However, it is understood that other embodiments of first and second locking surfaces can be provided.

The free end of the outer wall portion 52 located at the second axial portion 521, or the free ends of the wall tongues of the outer wall portion located at the second axial portion, may be attached to the inner wall portion 51, e.g. using an adhesive compound, an adhesive laminate or a glue. As another option, it may be possible to keep a corresponding, but limited portion of the inner and/or outer wall portions 51, 52 sufficiently wet to be able to bond them together without the addition of any further material for providing the adhesive function.

As yet another option, no adhesion at all may be needed, since the material may maintain its shape following the forming steps.

Figure 4A:
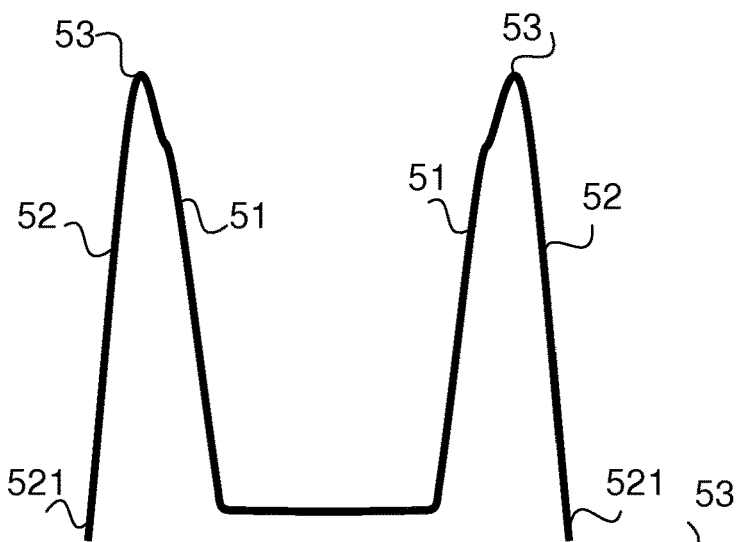
FIGS. 4a-4c schematically illustrate a method of forming a first version of the double walled container.
Figure 4B:
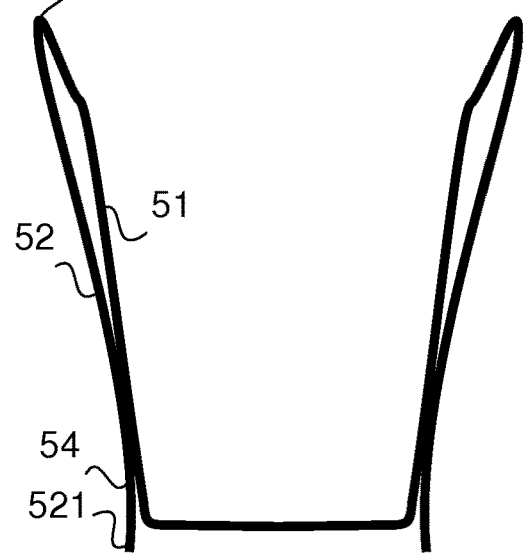

FIGS. 4a-4b schematically illustrate the pulp material processed according to FIGS. 3a-3c as seen in cross section. FIGS. 4a-4b provide a clearer picture of how the free end of the outer wall portion 52 is folded radially inwardly towards the inner wall portion 51.

Figure 4C:
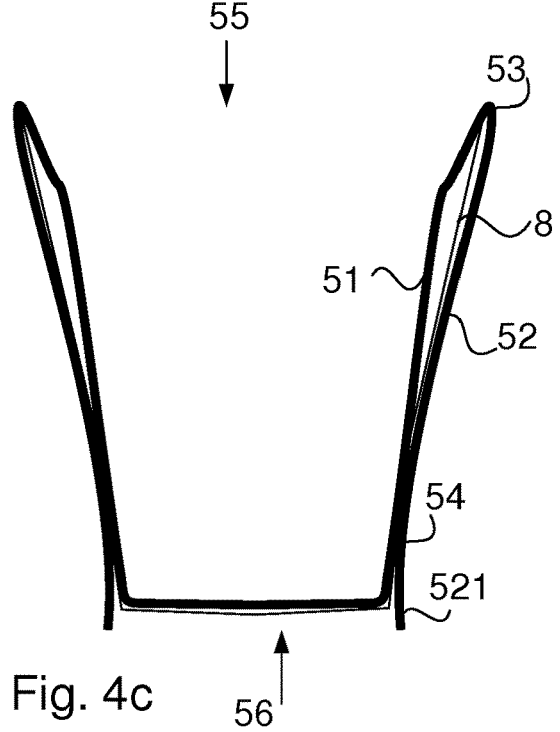

FIG. 4c schematically illustrates how a layer of lamination material 8 can be applied to secure the inner and outer wall portions 51, 52 to each other and optionally to provide improved sealing, such that gas or liquid is kept in and/or out of the container.

Figure 9:
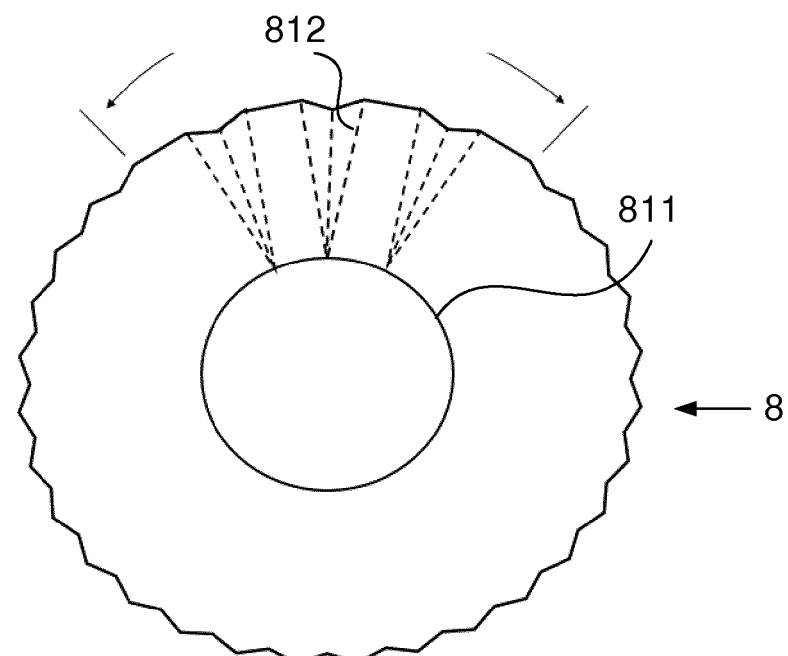
FIG. 9 schematically illustrate a first design of a lamination layer.
Figure 10:
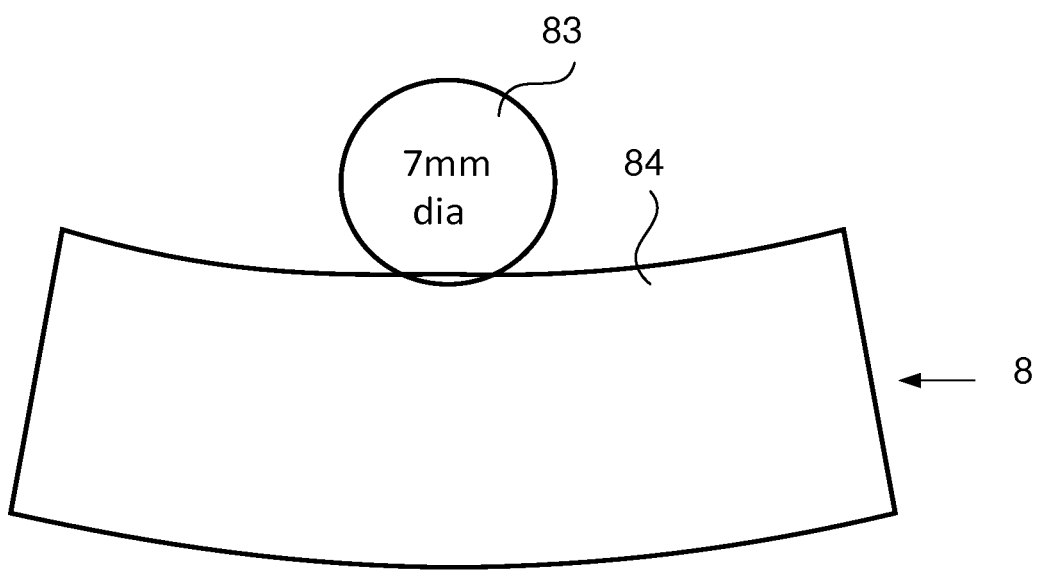
FIG. 10 schematically illustrate a second design of a lamination layer.

FIGS. 9-10 schematically illustrate how a film sheet can be converted into a suitable structure to be laminated to the double walled structure as disclosed herein.

Figure 5A:
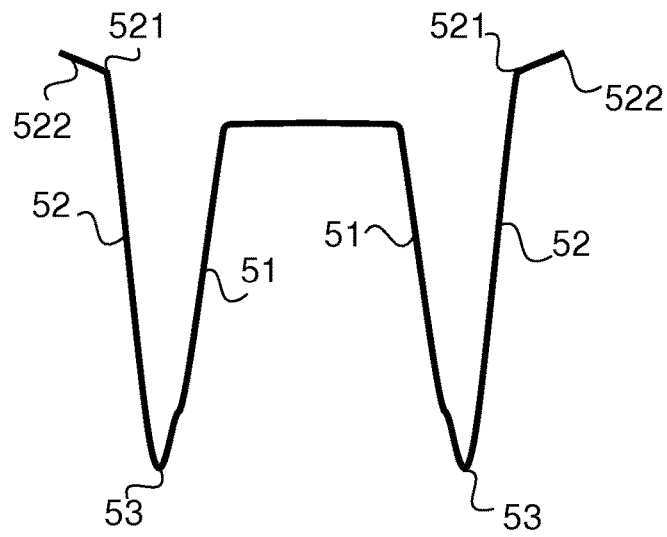
FIGS. 5a-5c schematically illustrate a method of forming a second version of the double walled container.
Figure 5B:
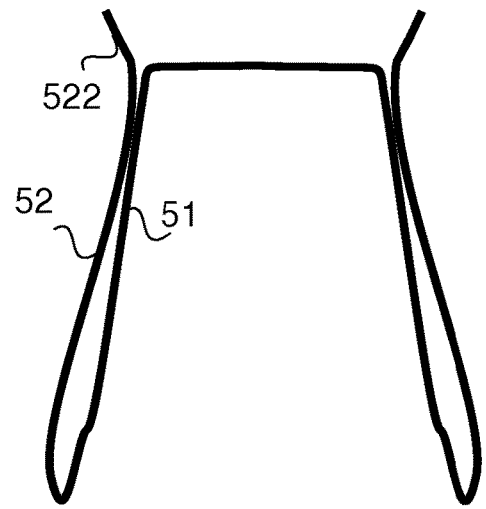
Figure 5C:
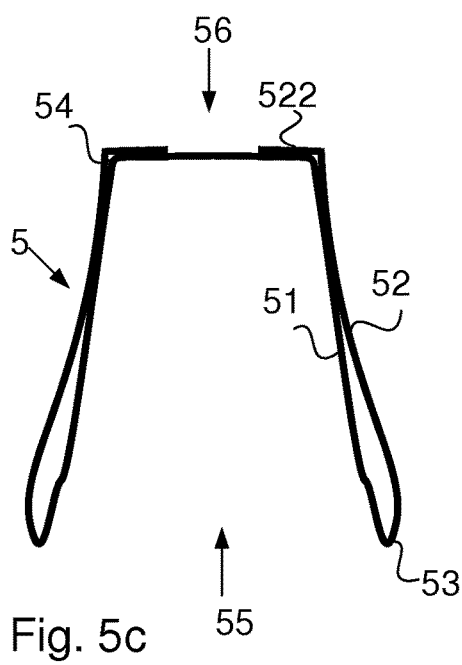

FIG. 5a-5c schematically illustrate how an alternative double walled structure can be formed.

Referring to FIG. 5a, the axially outermost portion of the free end of the outer wall portion 52, located at the second axial portion 521, is provided with one or more extensions 522. The extension 522 may extend continuously all the way around the free end of the outer wall portion 52, or it may be formed as one, two or more tongues.

Referring to FIG. 5b, the outer wall portion 52 is folded radially inwardly in the same manner as illustrated in FIGS. 4a-4c, whereby the tongues extend axially past the second end of the inner wall portion 51.

As illustrated in FIG. 5c, the extensions 522 are subsequently folded further radially inwardly, so as to at least partially overlap the bottom of the closed end 56 of the double walled structure 5.

At this position, the extensions 522 may be adhered to the bottom, or left without adhesive, as disclosed with respect to FIGS. 4a-4c.

A fold may be formed along the circumference of the bottom, thereby forming a circumferential fold, wherein the fold may be provided with at least one depression, preferably having multiple depressions continuously along the circumference. The depression/s can be used to absorb the excess material that is created when folding the extensions 522 radially inwards.

Figure 6:
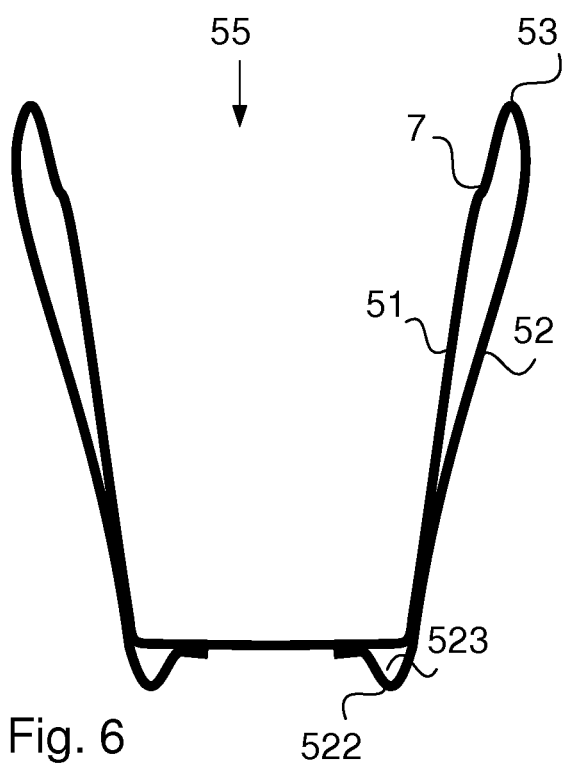
FIG. 6 schematically illustrates a third version of the double walled container.

FIG. 6 schematically illustrates yet another version, wherein the extensions 522 illustrated in FIG. 5a-5c have been folded and curved past the bottom, so as to form one or more rim spaces 523 positioned axially between the bottom and the respective extension 522. For example, a continuous rim space may be provided.

Figure 7:
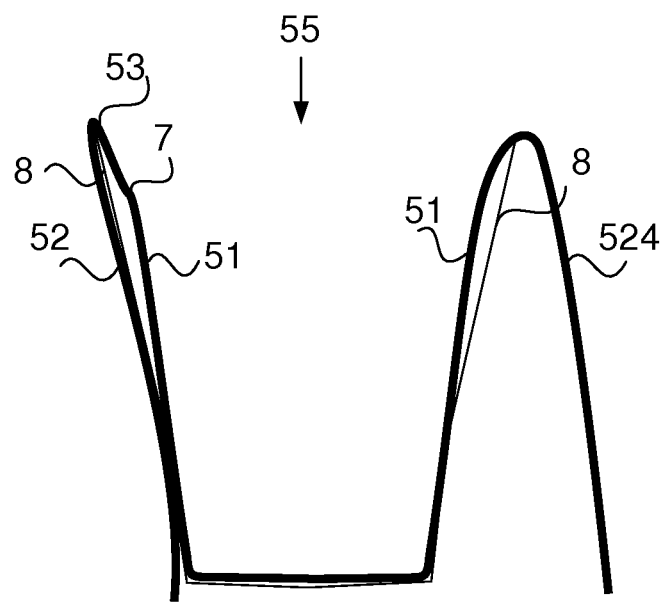
FIG. 7 schematically illustrates a fourth version of the double walled container.

FIG. 7 schematically illustrates yet another version, wherein the outer wall portion 52 has been folded radially outwardly and away from the inner wall portion 51, such that a handle portion 524 is formed.

Such forming may be facilitated by the formation of fold marks 6, as discussed above.

As illustrated in for example FIGS. 6 and 7, the inner wall portion 51 can comprise a radial step formation 7 located within a portion of the wall portion which is closest to the open end 55. The portion of the wall portion which is closest to the open end 55 preferably corresponds to 50% of an axial extent of the wall portion, preferably 33%, and more preferably 25%.

The radial step formation 7 may additionally or alternatively be provided at the outer wall portion 52. Further, the radial step formation 7 may be provided as a continuously circumferential step, or as one or more partially circumferential step portions.

The step formation 7 provides a variation of the distance between the inner and outer wall portions 51, 52, wherein the variation corresponds to 1-20% of the distance between the inner wall portion 51 and a center of the product space, preferably 1-10%, or more preferably 3-10%.

Referring to FIGS. 8a-8m, a description will now be given on how a double walled structure similar to the one illustrated in FIGS. 3a-3c and 4a-4c can be produced using, essentially, the production process outlines above with reference to FIG. 2.

FIGS. 8a-8m schematically illustrate tools and a pulp product having a rotational symmetric shape with the cross section as indicated in FIGS. 8a-8m.

Figure 8A:
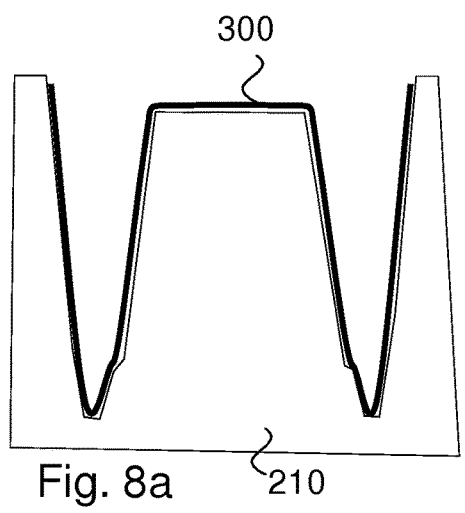
FIGS. 8a-8m schematically illustrate forming steps for forming the double walled container.

In an initial pickup step, a layer of pulp 300 is deposited on a pickup tool, and subsequently transferred to a first part 210 of a first pressing tool, which is illustrated in FIG. 8a.

Figure 8B:
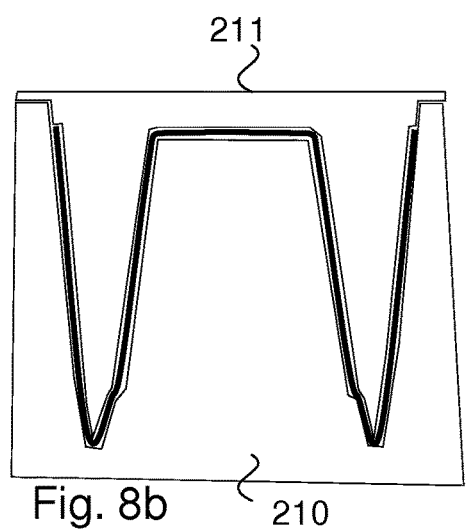

As illustrated in FIG. 8b, a second part 211 of the first pressing tool is subsequently engaged, such that the pulp layer 300 is pressed between the first and second parts 210, 211 of the first pressing tool, whereby the first pressing step 103 is performed.

In this pressing step, at least one of the tool parts 210, 211 may be heated, as described above, and vacuum may be applied through one or both of the tool parts.

Figure 8C:
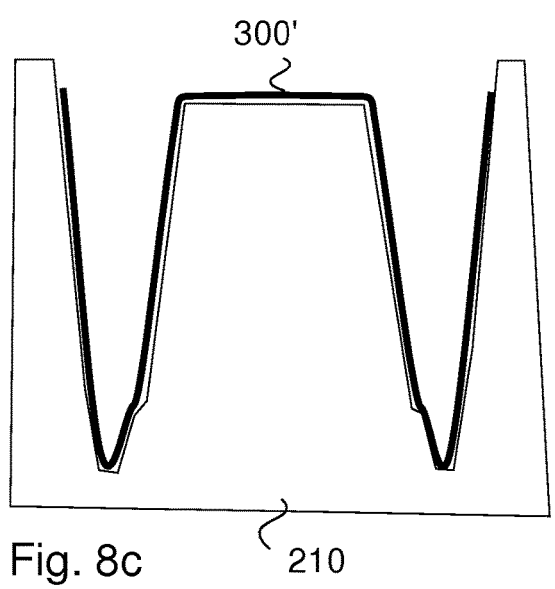

In FIG. 8c, the second part 211 of the first pressing tool has been removed and the pulp layer 300' is ready to be lifted off the first part 210 of the first pressing tool.

Figure 8D:
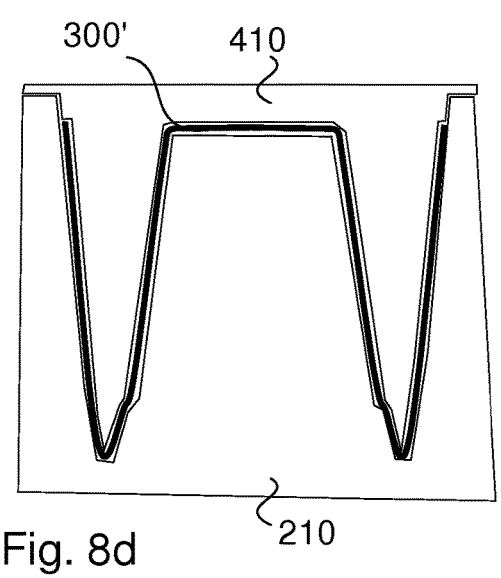

In FIG. 8d, a first transfer tool 410 is engaged, a vacuum being applied through a forming surface of the transfer tool. Optionally, an overpressure may be applied through the forming surface of the first tool part 210 of the first pressing tool, such that release of the pulp layer 300' is facilitated.

Figure 8E:
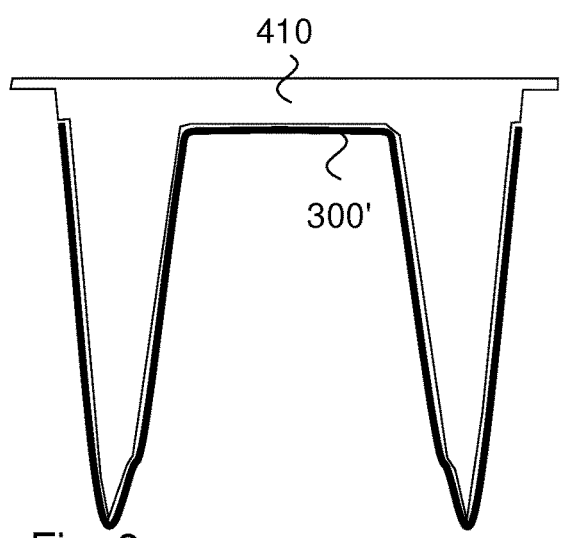

In FIG. 8e, the pulp layer 300' is engaged by the first transfer tool 410 and being transferred towards a second pressing tool.

Figure 8F:
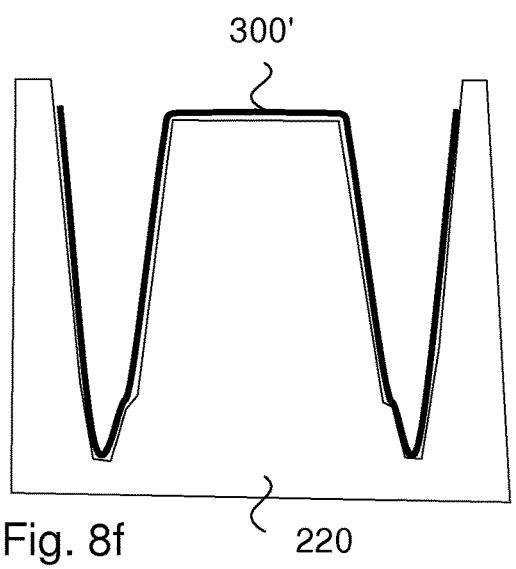

In FIG. 8f, the pulp layer 300' has been offloaded into a first part 220 of the second pressing tool.

Figure 8G:
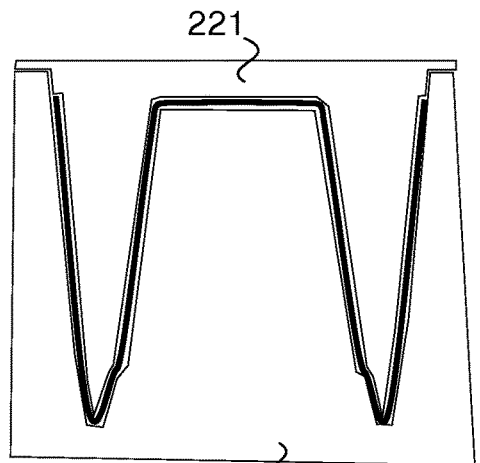

In FIG. 8g, a second part 221 of the second pressing tool has been engaged, so as to press the pulp layer 300' between the first and second parts 220, 221 of the second pressing tool, whereby the second pressing step 105 is performed. In this pressing step, at least one of the tool parts may be heated, as described above, and vacuum may be applied through one or both of the tool parts 220, 221.

Figure 8H:
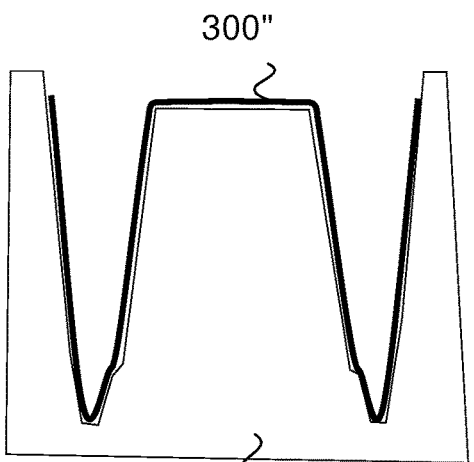

FIG. 8h illustrates the first part 220 of the second pressing tool after the second part 221 of the second pressing tool has been removed.

Figure 8I:
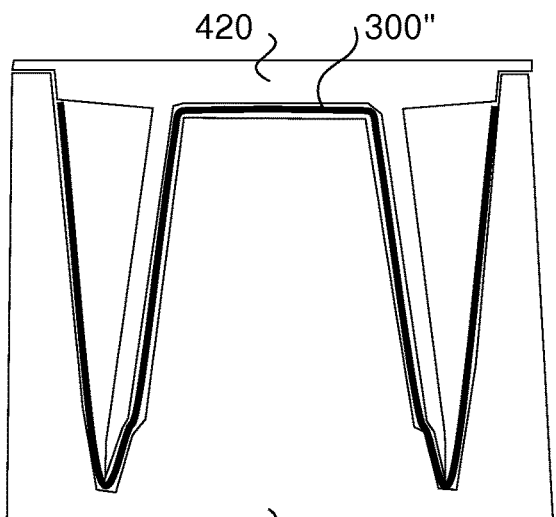

FIG. 8i illustrates the engagement of a second transfer tool 420. This second transfer tool 420 has an engagement surface 421 (the porous surface adapted to bear against the pulp layer so as to hold it), which engages only part of the pulp layer 300". As illustrated in the example, only an inner surface of the inner wall portion 51 is engaged, whereas the outer wall portion 52 is freely movable.

Figure 8J:
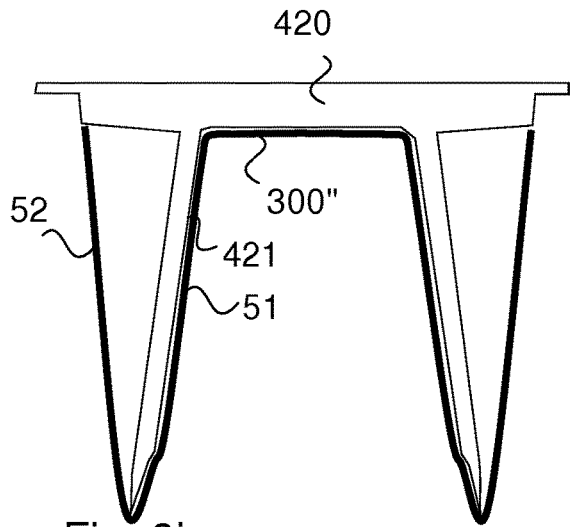

FIG. 8j illustrates the pulp layer 300" engaged by the second transfer tool 420 and being transferred towards a third pressing tool.

At this point, the outer wall portion 52 extends at an angle outwardly relative to the axial direction from the first axial portion of the pulp layer 300".

As seen in the axial direction, the axially distal portion of the second transfer tool 420 is undercut on its radial outer side.

Figure 8K:
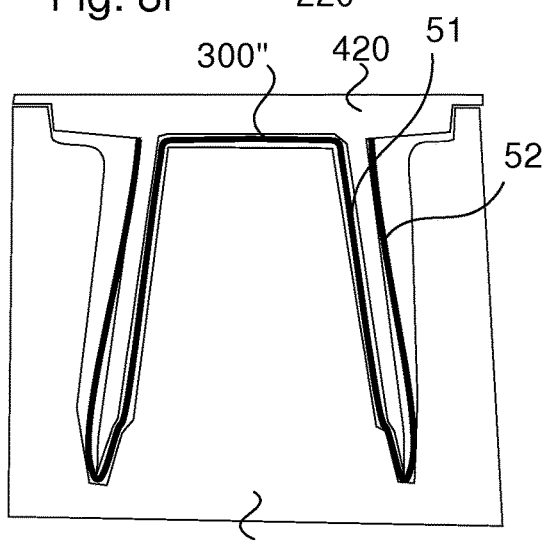

FIG. 8k illustrates how the second transfer tool 420 has been introduced into a first part 230 of the third pressing tool. During this introduction, the outer wall portion 52 of the pulp layer 300" is folded radially inwardly, such that the second axial portion of the outer wall portion 52 approaches the second axial portion of the inner wall portion 51.

Figure 8L:
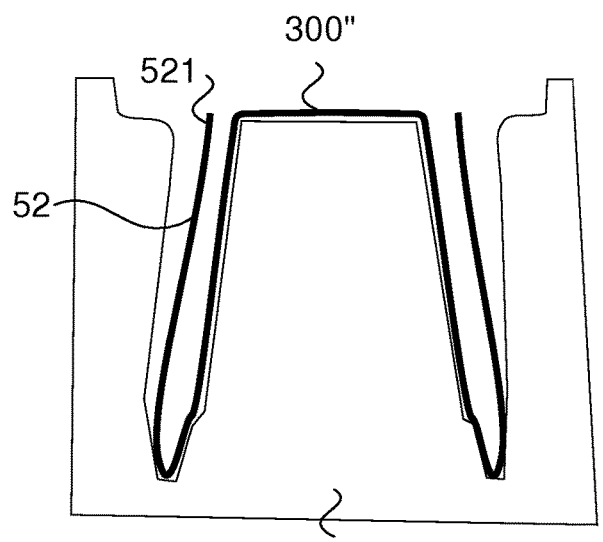

As illustrated in FIG. 8l, once the second transfer tool 420 has been removed from the first part 230 of the third mold, the second axial portion 521 of the outer wall portion 52 is movable radially outwardly. For example, at the location of the free end of the outer wall portion 52, at the second axial portion 521, the first part 230 of the third mold may present a diameter which is greater than a diameter of the free end of the outer wall portion 52 such that there is a circumferential space between the mold face and the free end of the outer wall portion 52.

Figure 8M:
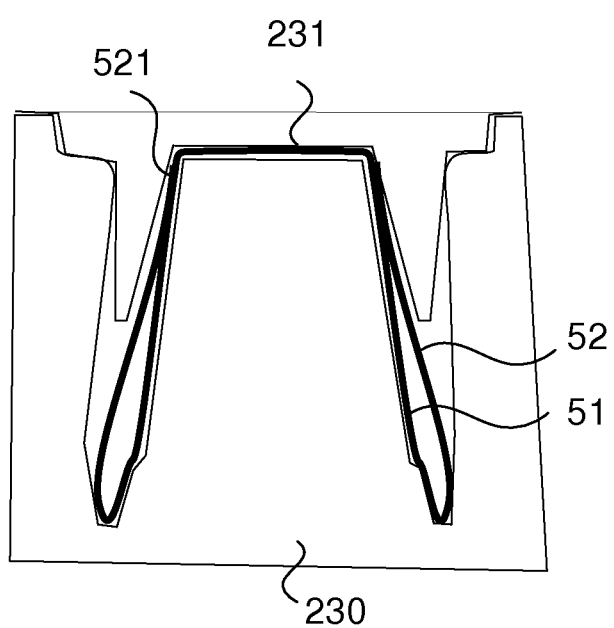

FIG. 8m illustrates how the second part 231 of the third pressing tool has engaged so as to finish the forming of the product, whereby the third pressing step 107 is performed.

As illustrated in FIG. 8m, the second part 231 of the third pressing tool is designed to press the pulp layer 300" only in the vicinity of the second axial portion, and more particularly, to press the free end of the outer wall portion 52, located at the second axial portion 521, radially inwardly against the second axial portion of the inner wall portion 51.

It is noted that prior to the engagement of the second part 231 of the third mold, an adhesive, a laminate, a glue, or the like, may be introduced between at least the free end of the outer wall portion 52 and the second axial portion of the inner wall portion 51.

In one embodiment, the second part 321 of the third mold may be designed to provide a pressing action only in an area which extends axially from the second axial end of the pulp layer/product and by a distance which is less than 20% of a total axial length of the pulp layer/product, preferably less than 10%.

In another embodiment, the second part 231 of the third mold may be designed to provide a pressing action only in an axial direction so as to clamp a bottom area at the second axial end portion of the pulp layer/product.

As mentioned above, in an optional step between any of the preceding pickup or pressing steps, a lamination material 8 may be applied. The lamination material 8 may be applied to a surface portion of the pulp material 300, 300', 300" that is to be at least partially concealed between inner and outer wall portions 51, 52. Preferably, the lamination material 8 is applied to the one of the inner and outer wall portions 51, 52 that is to undergo the least form change. In the illustrated example of FIGS. 8a-8m, it would be preferred to apply the lamination material 8 to the outer surface of the inner wall portion 51.

To this end, a lamination material 8 may be formed from a film sheet, e.g. a cellulose film, such as cellophane.

Referring to FIG. 9, a film sheet may be cut to an outer periphery according to what is needed. The film sheet may be pre-processed to provide a number of fold marks, for example one set of fold marks 811 adapted for forming a bottom surface and one set of fold radially extending marks 812 for allowing wall portions to be shrunk to fit the associated wall portion of the pulp product. Hence, the portion of the laminating material 8 that is to form the walls of the product may be provided with fold marks 811, 812 preparing it to be pleated once the lamination material 8 is inserted into the mold and pressed together with the pulp layer.

Referring to FIG. 10, there is illustrated an alternative way of preforming the lamination material 8, wherein a bottom forming portion 83 is arranged and a wall forming portion 84 are formed from a flat starting material, and designed not to overlap, or to overlap only to a very limited extent.

The alternative according to FIG. 9 is particularly suitable when the requirement for moisture-proofing is high, and the lamination material is thin. The alternative according to FIG. 10 is particularly suitable if the lamination material is thick or rigid.

Optionally, the film may be softened, such as by heating or by subjecting it to one or more solvents.

Additionally, or alternatively, the double walled structure may comprise an additional sealing layer. The sealing layer may have the form of a sleeve 500, as illustrated in FIG. 12f. The sleeve 500 may be adapted to function as a vapor and/or moisture barrier. The sleeve may be of a biodegradable material, e.g. a cellulose film, such as cellophane.

It is understood that in each pressing step 103, 105, 107, there may be a unique set of press tools and a unique set of processing parameters, including press time, tool temperature, pressing pressure, vacuum level (for the vacuum drawn through the press tool. Hence, the processing parameters may vary between different pressing steps. In the illustrating example below, the process is a three-step process, initiated with an application step, wherein a pick-up tool is immersed into a pulp slurry while vacuum is being drawn through a forming surface of the pick-up tool.

In the example illustrated in FIGS. 3a-3c, 4a-4c, 5a-5c, 6, 7 and 12a-12f there is formed a container 5, the inner wall portion 51 of which is substantially cylindrical or conical (e.g. frustoconical) and the outer wall portion 52 of which transitioning to the inner wall portion 51 at a rim at the open axial end 55 of the container 5.

During the initial forming step 103 the outer wall portion 52 is formed as a skirt extending around the rim and along the axial length of the inner wall portion 51.

The outer wall portion may be formed as a skirt comprising at least two wall tongues 525a, 525b separated by a slit.

During the second forming step 105, the outer wall portion 52, or the wall tongues of the outer wall portion, is folded radially inwardly and during the third forming step 107, the outer wall portion 52, or the wall tongues of the outer wall portion, is connected to the inner wall portion 51 at the second axial end, which is the closed axial end 56 of the container.

In the case wherein the outer wall portion comprises at least two wall tongues, the wall tongues may be formed such that they obtain an outwardly extending convex curvature, as seen from the inner wall portion.

The wall tongues may be formed such that they obtain the convex curvature between the first and second forming step, or during the second and/or third forming step, preferably before the second forming step.

The skirt wall may extend from the first axial end and through a length of 50-150% of the receptacle side wall, preferably 80-150%, 90-150% or 100-110%.

The skirt wall may be provided with shrink means, such as creases, slits, etc.

The skirt wall may be connected to the receptacle by adhesive. An adhesive film, such as cellulose film with laminated sealing layer, may be applied between the receptacle and the skirt wall.

Figure 11A:
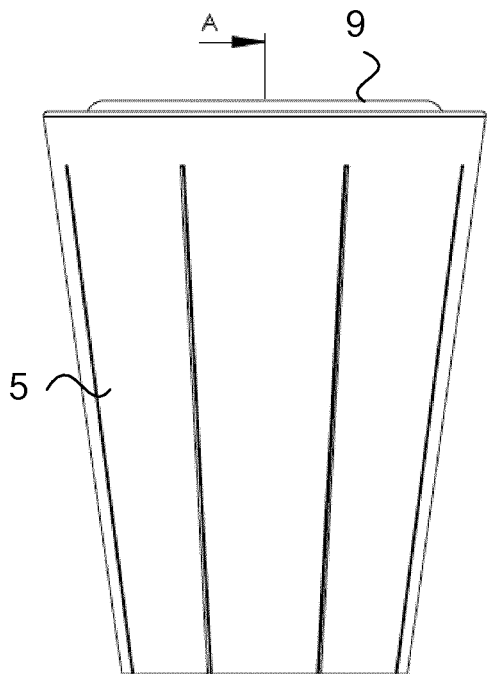
FIG. 11a-11d schematically illustrate a double walled structure in form of a cup and one embodiment of a lid.
Figure 11B:
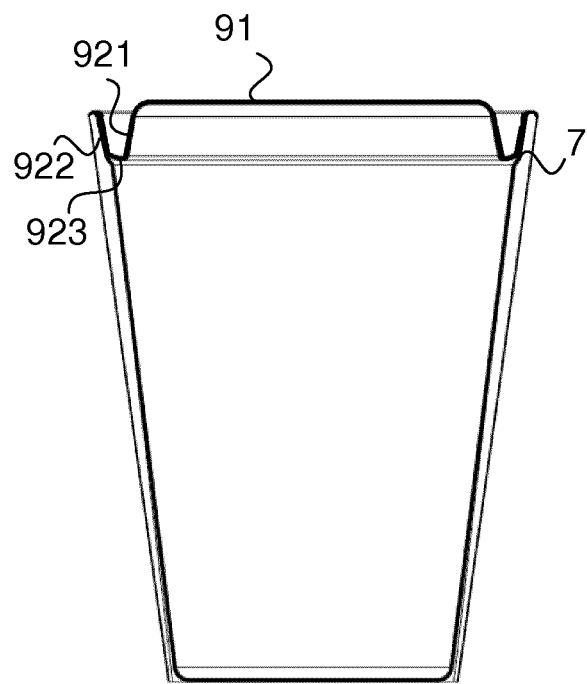
Figure 11C:
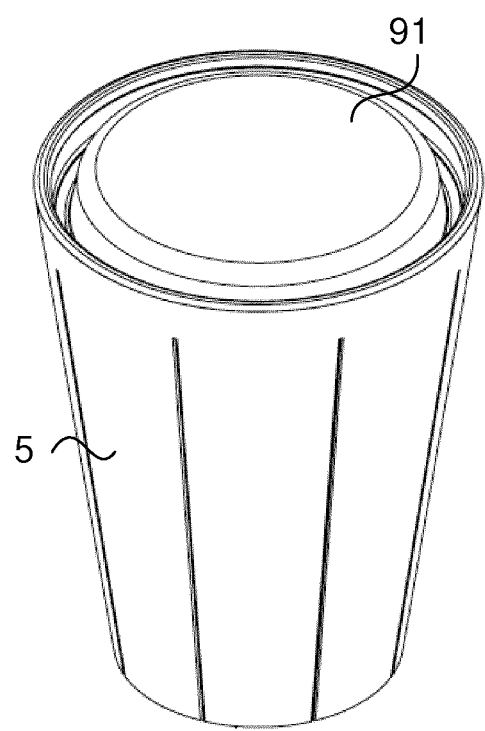
Figure 11D:
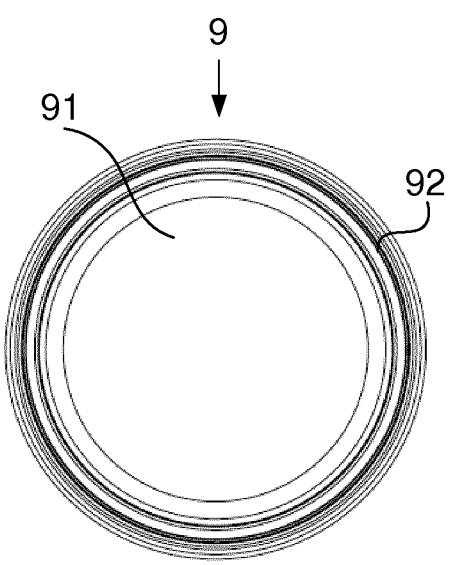

FIG. 11a-11c illustrates a double wall structure in form of a cup 5, wherein the open end of the receptacle is adapted to receive and attach a lid 9 detachably in such a way that a closed end is formed.

FIG. 11a-11d further illustrates one possible embodiment of a lid 9 for closing the open end of the receptacle.

The lid comprises a central portion 91 and a rim portion 92, surrounding the central portion. The rim portion comprises an inner rim wall 921, closest to the central portion 91 and an outer rim wall 922.

The outer wall portion is connected to the inner wall portion at a transition portion 923, positioned at a first axial extreme of the outer wall portion. The free end portion is positioned at a second axial extreme of the outer wall portion.

Further, the inner wall 51 of the receptacle can comprise the step formation 7 as described above, located within a portion of the wall portion which is closest to the open end, see FIG. 11b. The step formation 7 and the transition portion 923 may cooperate to axially limit the lid's introduction into the open end of the receptacle.

It is understood that the double-wall structure described above can be produced by using other known manufacturing methods and techniques, wherein the manufacturing parameters may vary from what is described above, for example the temperature used, the speed or time used for the different steps, or the number of pressing steps used to form the structure etc.

As one example, it is possible to use a sheet material as a starting blank, to fold the sheet material once to obtain the inner and outer wall portions, connected by the fold, and then to form the product space by joining ends of at least the inner wall portion, such that the fold forms a rim of the resulting structure.

The invention claimed is:

1. A method of making a disposable double walled structure comprising:
   an inner wall portion surrounding a product space presenting a cross section and extending along an axial direction, perpendicular to the cross section, between first and second axially spaced apart portions, and
   an outer wall portion at least partially surrounding the inner wall portion, wherein an insulating space is formed between the inner and outer wall portions,
   the method comprising:
   forming the inner and outer wall portions in one piece from a pulp material, such that the inner and outer wall portions are connected at the first axial portion and at least partially overlap as seen in a direction perpendicular to the axial direction, and
   bending at least one of the inner and outer wall portions in the direction perpendicular to the axial direction towards the other one of the inner and outer wall portions at the second axial portion, so as to form the insulating space.

2. The method as claimed in claim 1, wherein the forming comprises applying a material to a forming surface of a first press mold part of a first pressing tool and subsequently pressing the material between the first press mold part and a second press mold part of the first pressing tool.

3. The method as claimed in claim 1, wherein the bending is performed with initial water content of the pulp slurry layer of about 45-65% by weight.

4. The method as claimed in claim 1, wherein the forming comprises defining at least one fold mark in at least one of the inner and outer wall portions.

5. The method as claimed in claim 1, wherein the bending comprises shrinking at least one of the inner and outer wall portions in at least a circumferential direction.

6. The method as claimed in claim 1, wherein the forming comprises forming the outer wall portion such that at least two wall tongues are provided, wherein the wall tongues are separated by slits.

7. The method as claimed in claim 1, further comprising joining the inner and outer wall portions at said second axial portion.

8. The method as claimed in claim 1, further comprising providing an additional layer between at least part of a contact surface between the inner and outer wall portions.

9. The method as claimed in claim 1, further comprising forming the second axial portion of at least one of the wall portions, such that a residual deformation is achieved, so as to retain a shape of the double walled structure.

10. A method of forming a receptacle, comprising the method as claimed in claim 1, wherein the first axial portion presents an open end of the product space and the second axial portion presents a closed end of the product space.

11. The structure as claimed in claim 1, further comprising at least one fold mark extending along at least one of the inner and outer walls.

12. The method as claimed in claim 1, wherein the bending is performed with initial water content of the pulp slurry layer of about 25-45% by weight.

13. A disposable double walled structure of pulp material, comprising; an inner wall portion surrounding a product space presenting a cross section and extending along an axial direction, perpendicular to the cross section, between first and second axially spaced apart portions, wherein one of the axially spaced apart portions forms a closed end and the other one of the portions forms an open end, such that the space defines an axially open receptacle; and an outer wall portion at least partially surrounding the inner wall portion wherein an insulating space is formed between the inner and outer wall portions; wherein a circumference of the product space is continuous in the sense that it does not present any joint, wherein the inner wall portion and the outer wall portion are formed in one piece of material such that the inner wall portion and the outer wall portion are connected by a continuous fold of said piece of material at the first axial portion and at least partially overlap as seen in a direction perpendicular to the axial direction, and wherein the outer wall is continuous in the sense that it does not present any circumferentially extending joint at a circumference of the open end of the receptacle.

14. The structure as claimed in claim 13, wherein the inner wall portion or the outer wall portion comprises at least one radial step formation.

15. The structure as claimed in claim 13, wherein the second axial portion of the outer wall portion extends radially inwardly so as to at least partially overlap a bottom at the closed end.

16. The structure as claimed in claim 15, wherein the inner and/or outer wall portions comprise at least one depression located at a circumference of the bottom of the receptacle.

17. The structure as claimed in claim 13, wherein the outer wall portion comprises at least two wall tongues separated by slits, wherein the wall tongues of the outer wall portion are folded in a direction towards the inner wall portion at the second axial portion so as to form the insulating space.

18. The structure as claimed in claim 17, wherein the at least two wall tongues separated by slits are provided as four wall tongues, separated by slits.

19. The structure as claimed in claim 17, wherein the wall tongues are provided with locking surfaces that match such that the tongues can interlock to form the insulating space.

20. The structure as claimed in claim 13, further comprising an adhesive layer and/or sealing layer sandwiched between at least part of the inner and outer wall portions.

21. The structure as claimed in claim 13, wherein the open end is adapted to receive and attach a lid detachably in such a way that a closed end is formed.

22. A disposable double walled structure of pulp material, comprising; an inner wall portion surrounding a product space presenting a cross section and extending along an axial direction, perpendicular to the cross section, between first and second axially spaced apart portions, wherein one of the axially spaced apart portions forms a closed end and the other one of the portions forms an open end, such that the space defines an axially open receptacle, and an outer wall portion at least partially surrounding the inner wall portion; wherein: a circumference of the product space is continuous in the sense that it does not present any joint, the inner wall portion and the outer wall portion are formed in one piece of material, a first transition between the inner and outer wall portions is formed by a continuous fold of the one piece of material, extending as a continuous transition around the open end of the receptacle; the inner and outer wall portions at least partially overlap as seen in a direction perpendicular to the axial direction, a second transition between the inner and outer wall portions is formed by a joint between the inner and outer wall portions at the axially spaced apart portion that forms the closed end, and the insulating space is formed between the inner and outer wall portions from the first transition to the second transition.

* * * * *